Figure 1:
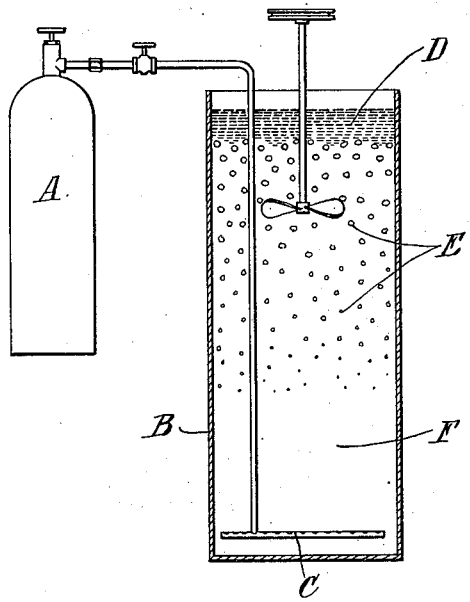

Feb. 27 1923.

B. T. BROOKS

PROCESS OF MAKING CHLORHYDRINS OF ORGANIC LIQUIDS

Filed July 2, 1919

1,446,873

WITNESS

INVENTOR

Benjamin T. Brooks

Patented Feb. 27, 1923.

1,446,873

UNITED STATES PATENT OFFICE.

BENJAMIN T. BROOKS, OF BAYSIDE, NEW YORK, ASSIGNOR TO CHADELOID CHEMICAL COMPANY, A CORPORATION OF WEST VIRGINIA.

PROCESS OF MAKING CHLORHYDRINS OF ORGANIC LIQUIDS.

Application filed July 2, 1919. Serial No. 308,311.

*To all whom it may concern:*

Be it known that I, BENJAMIN T. BROOKS, a citizen of the United States, and a resident of Bayside, in the county of Queens, Long Island, and State of New York, have invented certain new and useful Improvements in Processes of Making Chlorhydrins of Organic Liquids, of which the following is a specification.

The invention herein described relates to the manufacture of chlorhydrins, that is, organic compounds containing the elements of hypochlorous acid, the hydroxyl or alcohol group and chlorine. The chemically unsaturated substances which are combined with hypochlorous acid according to the present invention may be any liquid or solid organic substance, preferably an oil, which contains one or more chemically unsaturated groups, such as the olefine group or ring structures whose chemical behavior is often very similar to that of the olefine group, and particularly the cyclopropane cyclobutane group. By the process herein described, unsaturated petroleum oils, either the lighter or heavier distillates, unsaturated hydrocarbons of the terpene type, and unsaturated fatty acids or their esters, such as those of the oleic or linoleic type, are converted into the corresponding chlorhydrins. Of the terpene compounds, the commonest and cheapest is ordinary spirits of turpentine, which consists essentially of alpha and beta pinenes both of which are terpene olefines, and liquids well known in the arts. The presence of other substances which are chemically inert during the operation as herein described, for example, saturated petroleum hydrocarbons, benzol, carbon tetrachloride, and other solvents of like nature, is not objectionable, in fact, may be an advantage in some cases. Thus certain natural fatty oils, which are solid or semi-solid at temperatures in the neighborhood of 0° C. and solid substances such as cinnamic acid, stilbene, etc., may be successfully treated according to the present invention by dissolving the substance in an inert solvent such as gasoline, kerosene, benzene or carbon tetrachloride.

Previous published work refers repeatedly to the preparation of chlorhydrins of the gaseous olefines, for example, ethylene and propylene. Others have attempted to prepare chlorhydrins of certain hydrocarbons by first preparing a solution of hypochlorous acid and then agitating this with the substance to be treated. This method is difficult or impossible to carry out economically on a large scale since it is impossible to prepare solutions containing more than about three per cent of hypochlorous acid which are sufficiently stable for further work, particularly in the presence of metals, metallic salts and the like. Under these conditions free hypochlorous acid rapidly undergoes decomposition in the well known manner to oxygen, hydrochloric acid, chlorine and if hypochlorites are also present chlorates and chlorides are formed.

In the present invention the unsaturated organic liquid, or liquid mixture containing unsaturated organic material, is continuously subjected to the action of a cold dilute aqueous solution of hypochlorous acid. The combination of such substances, even though their solubility in water is exceedingly small, with hypochlorous acid proceeds smoothly and with sufficient rapidity to meet the requirements of commercial large scale operation even when aqueous solutions containing 0.25 per cent of hypochlorous acid are employed. It is particularly advantageous and economical to employ such dilute solutions on account of the instability of more concentrated hypochlorous acid solutions, as refered to above, and also because the reaction mixture is liable to become heated unduly, due to the heat of the reaction, when the more concentrated solutions are employed, this leading to stiill more rapid decomposition and loss of hypochlorous acid. In some cases oxidation of the organic material to undesired products may result under the latter conditions. Since the organic substances which may be used in the present invention are practically insoluble in water, the process is carried out substantially as follows.

The oil or oily solution to be treated is introduced into a reaction vessel together with an aqueous solution of an alkali carbonate or bicarbonate. Chlorine is then passed into the aqueous layer, and in most cases the aqueous solution will be the bottom layer. Here the chlorine is absorbed and free hypochlorous acid is formed in the solution. Since it is well known that carbonic acid is a stronger acid than hypochlorous acid, in fact will displace the latter from its salts, the hypochlorous acid does not become fixed in the form of hypochlorite salts but remains in the free or uncombined state and is therefore available for direct combination with the unsaturated substance to form a chlorhydrin.

In general, salts of weak acids or certain basic salts which, when introduced into chlorine water, will combine with the hydrochloric acid and leave the hypochlorous acid substantially in the free or uncombined form, may be employed in the practice of this invention. However, I prefer the alkali carbonate or bicarbonate on account of their efficiency and also their cheapness and availability. Thus calcium carbonate in a finely divided form may be employed but, owing to its relative insolubility in water, particularly in water containing a calcium salt such as calcium chloride, the process must be carried out much more slowly and the aqueous solution is very liable to become charged with an excess of free chlorine. The commonly accepted theory for the action of chlorine on water is expressed by the following equation

$$Cl_2 + H_2O \rightleftharpoons HCl + HOCl$$

The function of the alkali carbonate in the present process is to combine with the hydrochloric acid which is formed, as in the above equation. However, I do not in any way limit myself by this explanation. Other substances such as borax, alkali phosphates, salts of weak organic acids like acetates, benzoates, etc., certain basic salts such as the oxychlorides of magnesium, copper and the like, function in much the same manner and their behavior is capable of the same theoretical explanation.

It should be pointed out that the preferred form of this process is not one of generating hypochlorous acid by adding a weak acid or acid salt to a hypochlorite and then treating the unsaturated substance. Nor can the present process be considered as the reaction of an unsaturated organic substance with elementary chlorine. Under the preferred conditions herein described chlorine and the organic matter do not come into contact.

The aqueous solution containing hypochlorous acid is continually in contact with the unsaturated oil or oily mixture and the latter takes up hypochlorous acid continually during the process to form the corresponding chlorhydrin. This reaction may be facilitated by intimately mixing the two liquids, as by vigorous agitation or by circulating or atomizing one liquid through the other. Chlorine is passed into the aqueous solution until the calculated quantity, as determined by simple calculation and weighing or otherwise metering the chlorine, has been introduced or until no further change is noted in the organic material. The saturation of the substance by hypochlorous acid may be determined by several of the well known methods for determining chemical unsaturation, for example by ascertaining its iodine or bromine absorption value, or qualitatively by cold dilute permanganate solution. Also it is noted that toward the completion of the reaction the mixture smells strongly of hypochlorous acid.

In order to insure against the direct chlorination of the organic material (when the simultaneous production of chlorhydrocarbons is not desired) it is necessary completely to absorb the chlorine in the aqueous solution so that chlorine gas bubbles and oil globules do not come into contact. This may be accomplished in several ways, for example by carrying out the reaction in a tall reaction vessel and so regulating the agitation that the portion of the aqueous liquid where the chlorine is introduced remains substantially free from oil globules, or in other words that the agitation be regulated so that the tendency of the oil globules to rise to the surface, or sink to the bottom is not overcome. This procedure is illustrated by the simple apparatus shown in Figure 1 (which shows a reaction chamber in vertical section and a chlorine supply cylinder in elevation). Certain mechanical improvements upon this type of apparatus have been devised which permit more rapid operation. For example vigorous agitation and consequently thorough mixing of the two liquids may be had, without subjecting the oil to the action of chlorine itself, by constructing the apparatus so that two or more zones are established, one in which thorough agitation of the oil and aqueous phases is effected and one containing aqueous solution substantially free from oil globules. Chlorine is introduced into the latter zone and means may be provided for the slow interchange of the liquid in the two zones. In the preferred form of apparatus for practicing the invention I have employed an apparatus in which the liquid mixture is divided into three zones. Thus in the appended Figure (2) (likewise showing a vertical section of the reaction chamber), E is the zone in which the mixture of oil and aqueous solution is vigorously mixed, D is a zone which is not agitated and in which the mixture or emulsion passing into it from E is permitted quietly to separate into two distinct layers, and C is the zone into which chlorine is passed and since it contains only aqueous solution this zone may be stirred if desired. Somewhat better absorption of chlorine is brought about in zone C by partially filling this space with solid material such as coke, broken brick, tile and the like which serves to retard the escape of the chlorine bubbles.

The apparatus shown in Figures (1) and (2) may be constructed of wood, cement or iron which is coated with cement or lead. Iron in contact with such solutions is slowly corroded but may be used.

When a common simple terpene (for instance ordinary turpentine) is treated with hypochlorous acid (e. g. equimolecular quantities) in the cold, there is first formed terpene chlorhydrins. These bodies are oils, much heavier than water, having a camphor-like odor and these are more stable than the chlorhydrins of the open chain series. When a considerable excess of hypochlorous acid is used, the internal ring of the terpene may be broken, and a dichlorhydrin formed. This reaction does not take place to any substantial extent if a considerable excess of hypochlorous acid is not used.

When the reaction is completed, or as nearly completed as may be desired, the process is stopped, the mixture allowed to stand until the oil and water layers have separated when they may be drawn or siphoned off separately in the usual manner.

While I have referred to three per cent solutions of hypochlorous acid as representing the preferred maximum strength I do not wish to be limited to this strength in all cases as stronger solutions may be used especially when the provision is made to compensate for the heat of the reaction so that undesirable bodies will not be formed in this manner.

The chlorhydrins made according to the preferred form of the present invention are substantially free from dichlorides and oxidation products and are suitable for use as such, conversion into other substances or used in syntheses without further purification.

What I claim is:—

1. The process of making chlorhydrins which comprises subjecting unsaturated substances containing cyclic olefinic linking in the liquid form to the action of free hypochlorous acid whereby chlorhydrin material is obtained.

2. The process of making chlorhydrins which comprises subjecting cyclic unsaturated substances contaning an olefinic linking in the liquid form to the action of a dilute aqueous solution of hypochlorous acid whereby chlorhydrins are formed.

3. The process of making chlorhydrin material which comprises subjecting a terpene in a liquid form to the action of a dilute aqueous solution of hypochlorous acid containing less than three per cent of said acid and in simultaneously adding chlorine to the aqueous phase of the reaction mixture whereby a constant supply of hypochlorous acid is rendered available in the zone of reaction.

4. The process of making chlorhydrins which comprises subjecting terpene liquid olefines to the action of hypochlorous acid.

5. The process of making chlorhydrins which comprises reacting on liquid terpene olefines with a dilute aqueous solution of hypochlorus acid in the free state.

6. The process of making chlorhydrins which comprises reacting on liquid terpene olefines with an aqueous solution of hypochlorous acid having a strength of less than three per cent.

7. The process of making chlorhydrins which comprises introducing chlorine into an aqueous solution containing liquid terpene hydrocarbons, whereby hypochlorous acid is formed; maintaining the strength of the hypochlorous acid solution below three per cent and in progressively supplying chlorine to aqueous phase of the reaction mixture to maintain a supply of hypochlorous acid therein.

8. A process of making chlorhydrins which comprises reacting upon a liquid terpene compound having an olefine linkage, with a solution of hypochlorous acid, the hypochlorous acid in the reaction zone representing the principal halogenating agent there present and generating hypochlorous acid in the said solution, but out of the said reaction zone.

BENJAMIN T. BROOKS.

Certificate of Correction.

Figure 2:
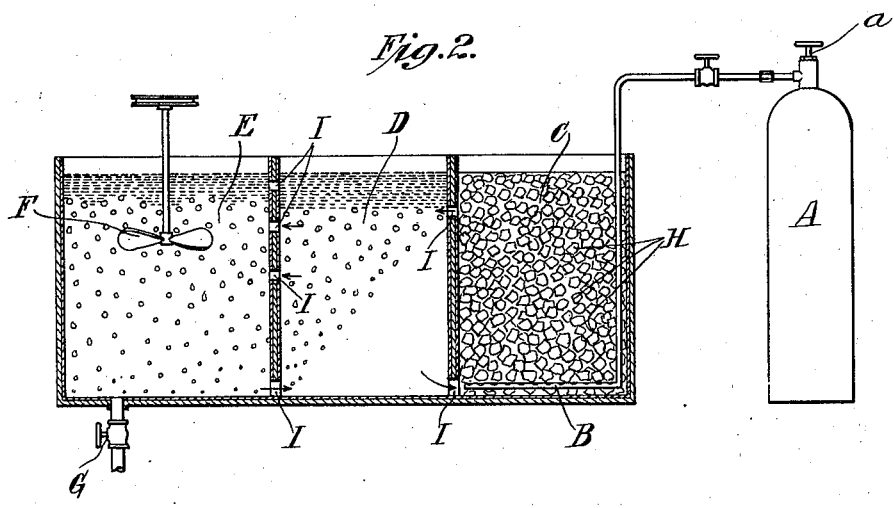

It is hereby certified that in Letters Patent No. 1,446,873, granted February 27, 1923, upon the application of Benjamin T. Brooks, of Bayside, New York, for an improvement in "Processes of Making Chlorhydrins of Organic Liquids," errors appear requiring correction as follows:

The drawing containing Figures 1 and 2, should appear as shown below, as part of the Letters Patent; page 1, line 91, " stiill " should be *still;* page 3, lines 60 and 61, claim 3, strike out the words " containing less than three per cent of said acid "; same page, line 67, claim 4, for " terpene liquid " read *liquid terpene;*

Feb. 27 1923.
B. T. BROOKS
1,446,873

PROCESS OF MAKING CHLORHYDRINS OF ORGANIC LIQUIDS

Filed July 2, 1919

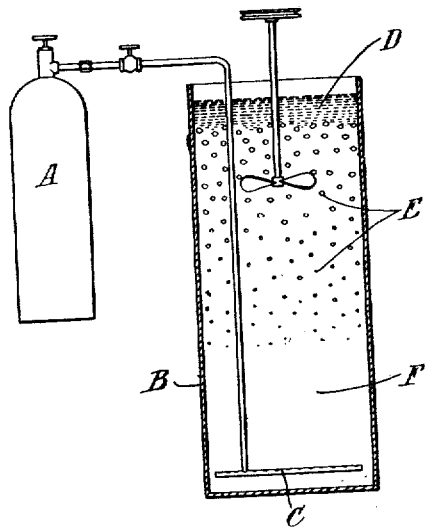

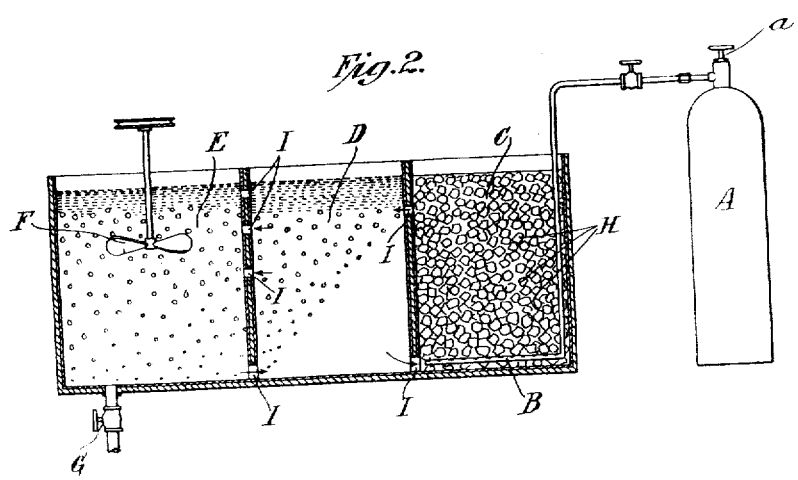

INVENTOR
Benjamin T. Brooks

WITNESS and that the said Letters Patent should be read with these corrections therein that the same may conform to the record of the case in the Patent Office.

Signed and sealed this 8th day of May, A. D., 1923.

[SEAL.]

KARL FENNING,
*Acting Commissioner of Patents.*